Oct. 9, 1973  B. W. TLEIMAT  3,764,483
ROTATING DISK STILL WITH A HYDRODYNAMICALLY APPLIED THIN FILM
Filed Oct. 5, 1970  3 Sheets-Sheet 3
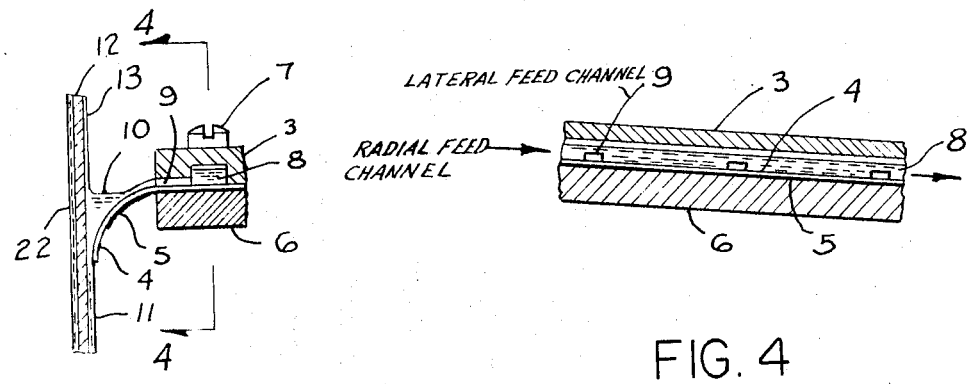
FIG. 3
FIG. 4
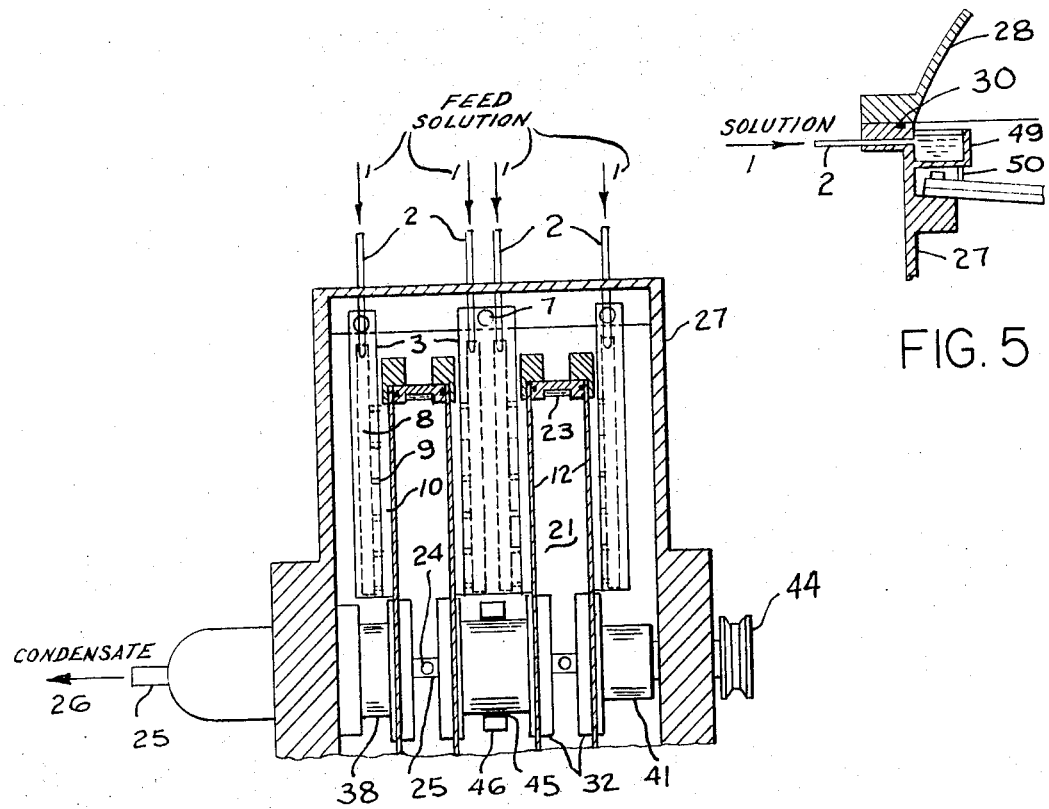
FIG. 5
FIG. 6
INVENTOR
Badawi W. Tleimat

United States Patent Office 3,764,483
Patented Oct. 9, 1973

3,764,483
ROTATING DISK STILL WITH A HYDRO-
DYNAMICALLY APPLIED THIN FILM
Badawi W. Tleimat, 2743 Wiswall Drive,
Richmond, Calif. 94806
Filed Oct. 5, 1970, Ser. No. 77,883
Int. Cl. B01d 1/22, 3/08, 3/28
U.S. Cl. 202—236       3 Claims

ABSTRACT OF THE DISCLOSURE

A single-effect still is composed of a chamber which houses a rotating heat-transfer disk mounted on a hollow shaft. Distilland is hydrodynamically spread into a thin film on one side of the rotating disk by a stationary flexible blade. Heating vapor is brought into contact with the other side of the disk. The latent heat released by the condensation of the heating vapor evaporates a fraction of the distilland as a pure vapor leaving a more concentrated residue. Preferably pairs of such disks provide interconnected parallel cavities in which the heating vapor condenses and is withdrawn from the periphery of the cavity by a stationary scoop communicating with a central tube going outside of the still. Collected residue is taken outside of the still from the bottom of the chamber.

In the drawings:

FIG. 3 is a cross section along the line 3—3 of FIG. 2;

FIG. 4 is a cross section along the line 4—4 of FIG. 3;

FIG. 5 is a view similar to a protion of FIG. 1 but showing an alternate method of distilland distribution to a rotating disk; and FIG. 6 is a cross section along the line 6—6 of FIG. 2.

Figure 1:
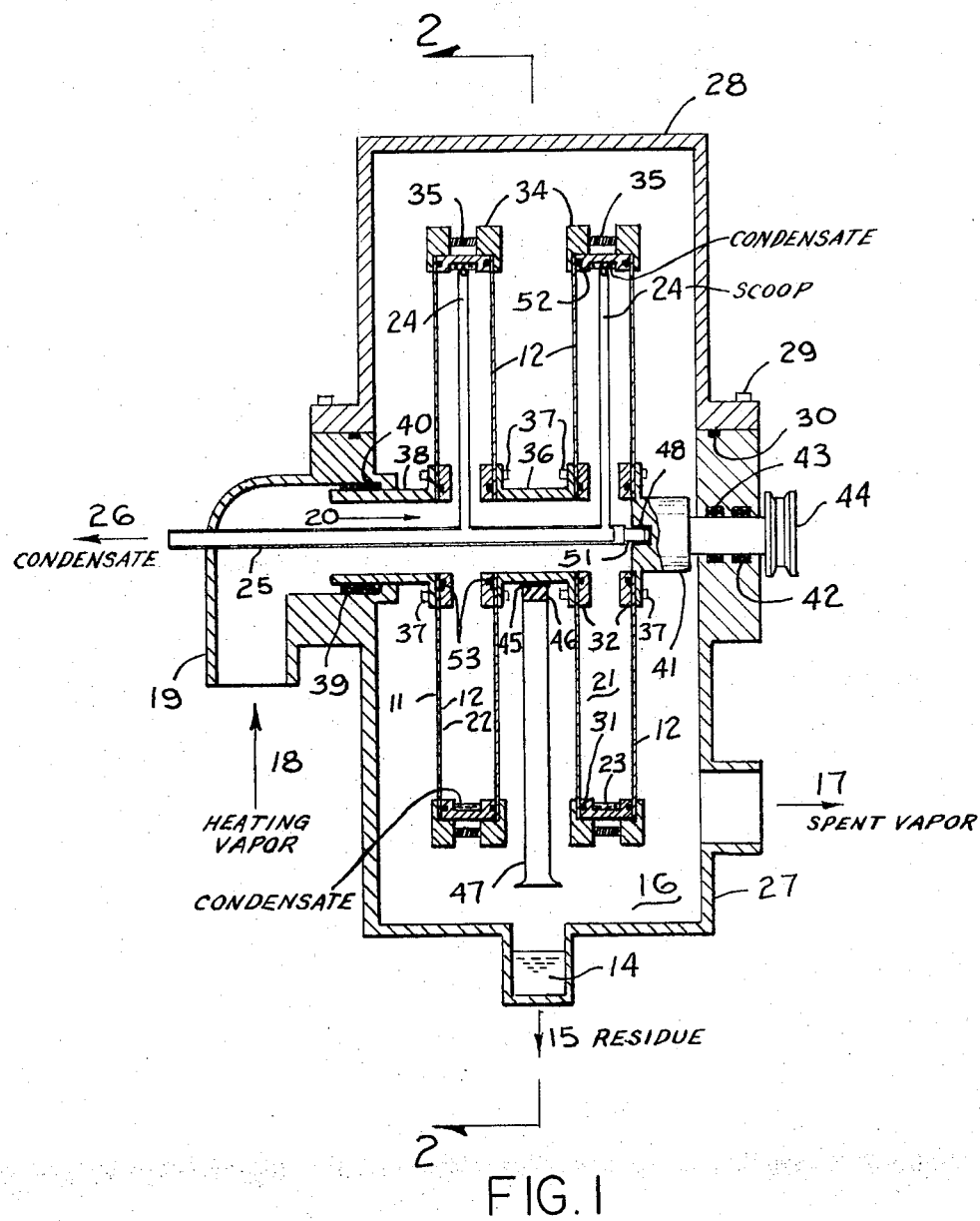
FIG. 1 is a vertical axial cross section of a still embodying the invention.

A still embodying my invention is generally comprised of a tight enclosure defining a first chamber 16 (FIG. 1) and composed of a lower portion 27 and an upper cover 28 secured together with bolts 29 and a gasket 30. Within the first chamber are one or more rotating flat or conical disk 12 clamped, preferably in pairs, onto outer rings 31 and hubs 32 connected by spokes 33. One side or the outside of each disk 12 is open to the first chamber 16. Outer clamp rings 34 are secured by screws 35. A hollow coupling 36, a hollow journal 38 and a drive shaft 41, are secured together in disk-clamping relationship and in axial alignment by screws 37. The clamped disks 12 thus form parallel, second chambers 21 interconnected by the hollow coupling 36. The second chambers are isolated from the first chamber and are open to the other side or inside of each disk 12. If desired, these chambers are sealed from the inside of the still by means of suitable gaskets 52 and 53. The journal 38 rotates inside of bearing 39 with a suitable seal 40. The hollow coupling 36 rests on a bearing 46 with a suitable bearing insert 45. The bearing 46 has supports 47 suitably connected to the lower housing 27. The drive shaft 41 is connected to the hubs 32 and the rotating disks 12 by means of screws 37 and is supported on bearings 42 with suitable seals 43, being driven by a suitable drive through a drive pulley 44.

Figure 2:
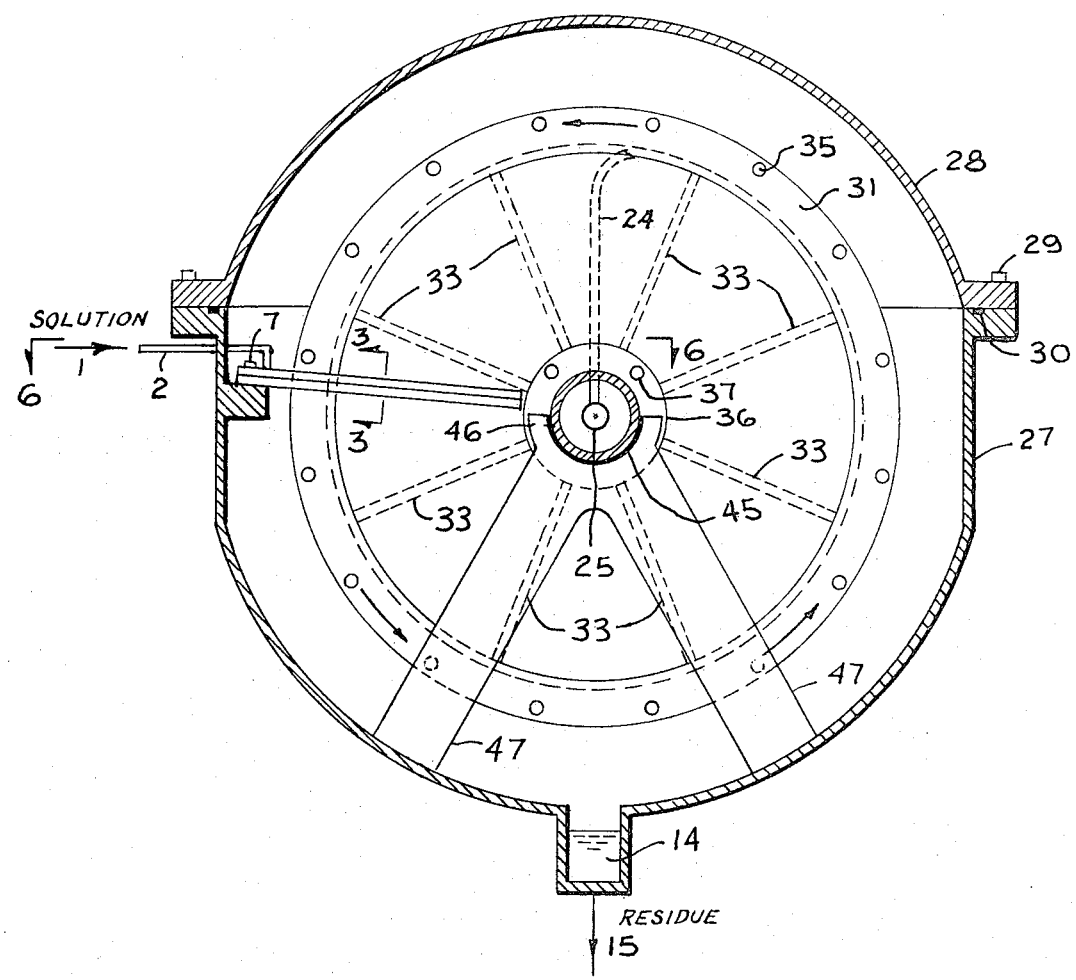
FIG. 2 is a cross section along the line 2—2 of FIG. 1.

The solution from a source represented by an arrow 1 (FIGS. 2 and 6) is introduced into the still through a tube 2 which is in communication with the hollow interior of a number of top blade holders 3 (FIG. 3). Each top holder 3 is secured to a bottom blade holder 6 and to the bottom housing 27 by means of bolts 7, FIG. 2. Preferably, the blade holders have a slight slope (FIG. 2) to ease the feed flow. The typical top holder 3 has a longitudinal channel 8 with slots 9 along the channel for feed distribution. A radially extending flexible blade 4 (FIG. 3) and a back-up, flexible, flat spring 5 are held securely by the top holder 3 and the bottom holder 6 against the adjacent rotating heat-transfer disk 12, the blade curving toward and having its free edge displaced in the direction of rotation of the disk.

In operation, the feed from the source of solution 1 flows longitudinally through the tube 2 into the channel 8 and then out of slots 9 into a pool 10 above the blade 4 (FIG. 3). The combined action of the motion of the disk 12 and the pressure exerted by the flat spring 5 on the flexible blade 4 forces the solution in the pool 10 to form into a thin, hydrodynamic film 11 on the disk 12. The rotation of the disk 12 creates an artificial gravity that spreads the film 11 into a thin layer substantially covering one side of the disk, thereby decreasing its thermal resistance. Heating vapor from a source represented by an arrow 18 is introduced into the disk chambers 21 through an inlet elbow 19 and condenses into a film 22 formed on the other side of the disk 12. The heat released by the condensation of the heating vapor into a film 22 formed on the other side is conducted through the condensate film 22, through the disk 12 and into and through the film 11. This causes at least partial evaporation of the film 11 into vapor sometimes leaving a residue film 13.

Any excess liquid from the distilland film 11 leaves the periphery of the rapidly rotating clamp rings 34 with a high speed and impinges on the bottom housing 27 and cover 28. This excess liquid slides down and collects at the bottom in a pool 14 (FIG. 1) and is discharged from the still through an outlet represented by an arrow 15. Due to the high speed of the liquid drops discharging from the periphery of the clamp rings 34, they are not trapped by the surrounding vapor thus leaving a pure vapor. The spent vapor is withdrawn from the still at an outlet represented by an arrow 17 (FIG. 1).

The heating vapor from the source represented by the arrow 18 introduced into the still through the elbow 19 and the hollow shaft cavity 20 into the condensing chambers 21 condenses on the inside of the disks 12 and forms the condensate film 22. The artificial gravity created by the rotation of the disks 12 causes the film 22 to be quite thin and thus decreases its thermal resistance. The condensate collected at the inside periphery of each chamber 21 gathers into a circumferential pool 23 (FIG. 1). The high velocity of the spinning condensate pool 23 creates a pressure differential across a stationary scoop 24 (FIGS. 1 and 2), and causes the condensate to flow into the scoop and into a center tube 25 through which the condensate is discharged out of the still as indicated by an arrow 26. The center tube 25 is sealed at one end and is formed into a stationary shaft 51 inside a rotating bearing 48.

FIG. 5 shows an alternate method of communicating the feed into the channel 8. The feed represented by an arrow 1 is introduced into the still by a tube 2 and is discharged into a trough 49 (FIG. 5) from which tubes 50 communicate individually with each of the feed channels 8.

In the conversion of saline water to potable water by distillation, the cost of product is greatly affected by the cost of the evaporators and cost of the energy required to drive the distillation process. Improvements in the effectiveness of the heat-transfer surface would result in a reduction of either or both the cost of the evaporator and the cost of energy, and thus result in a reduction of the cost of potable water.

Experiments conducted on one form of this evaporator have disclosed very high values of heat-transfer coefficient. This still was utilized in a vapor compression distillation scheme where the generated vapor was withdrawn and compressed by a mechanical compressor to raise its saturation pressure and temperature then was introduced into the still as the heating vapor. As an example, actual experiments performed under subatmospheric pressures with copper disks in a still of the kind illustrated in FIG. 1 gave the results shown in Table 1 below:

TABLE 1

| Type of water | Speed of rotation of disk (r.p.m.) | Evaporator temperature (° F.) | Temperature difference between condenser and evaporator (° F.) | B.t.u./hr. ft.², ° F. | Distillate rate (lbs./hr. ft.²) |
|---|---|---|---|---|---|
| Fresh | 200 | 137.3 | 4.7 | 3,000 | 12.4 |
| Do | 200 | 139.1 | 1.6 | 3,570 | 5.8 |
| Saline | 200 | 139.5 | 5.5 | 2,440 | 13.2 |
| Do | 200 | 140.9 | 1.8 | 2,940 | 5.2 |
| Fresh | 400 | 137.9 | 3.1 | 4,220 | 13.2 |
| Do | 400 | 139.5 | 0.7 | 6,960 | 4.9 |
| Saline | 400 | 140.2 | 3.5 | 4,220 | 14.6 |
| Do | 400 | 140.8 | 1.1 | 5,300 | 5.8 |
| Fresh | 600 | 137.9 | 2.2 | 6,120 | 13.6 |
| Do | 600 | 139.1 | 0.9 | 8,810 | 7.8 |
| Saline | 600 | 140.2 | 2.6 | 5,710 | 14.7 |
| Do | 600 | 140.7 | 0.9 | 6,700 | 5.9 |
| Fresh | 800 | 138.3 | 1.8 | 7,660 | 13.9 |
| Do | 800 | 141.1 | 0.5 | 10,350 | 5.2 |
| Saline | 800 | 140.2 | 2.3 | 6,460 | 14.7 |
| Do | 800 | 141.0 | 0.7 | 8,800 | 6.1 |

Saline water used in these experiments was taken from the San Francisco Bay at Richmond, Calif. For conventional evaporators, the overall heat-transfer coefficient, U, is of the order of 500 instead of the values ranging between 2,440 to 10,350 as shown. For comparison, a still of this type operated at 800 revolutions per minute would produce 14.7 pounds of pure water from saline water per ft.² per hour at a temperature difference of 2.3° F., whereas a conventional evaporator would produce an average of 5 pounds of water per ft.² per hour at a temperature difference of 10° F. The conventional evaporator produces 0.5 pound of water per ft.² per degree F. per hour while my still at the above conditions produced 6 pounds of water per ft.² per degree F. per hour or 12 times more effective than the conventional evaporator.

Another and extremely useful advantage of the wiping action of the flexible blade is that it insures the deposition of a thin film of distilland due to the hydrodynamic action. This renewal and replenishment of the distilland film in every revolution of the disk prevents solid from being deposited on the surface. If this flexible blade were not used and spreading of the feed were only by centrifugal force due to rotation of said disk, dry spots could develop. Such dry spots would prevent the distilland from reaching the surfaces behind them, thus reducing the effectiveness of the heat-transfer surface. This new, useful, and remarkable result has not been realized with proposed thin-film stills utilizing stationary and rotating surfaces or with stationary surfaces and rotating wipers.

This still, according to my invention, is particularly useful in the purification of waters, such as brackish water, sea water, and treated sewage water. There are, however, many other impure liquids such as organic liquids, alcohols, ethers, fruit juices, and dairy products that could be distilled, concentrated and purified with this still. I do not, however, limit the use of my invention to these substances, and contemplate its use for other liquids and dissolved solids mixtures in which short exposure time is beneficial.

It is obvious that variations within the skill of the art may be made in the rotor without altering the essence of the invention. While the illustrations show the details of preferred embodiments, it is to be understood that such disclosure is intended as illustrative, rather than limiting.

I claim:

1. A rotating disk still comprising means forming a tight enclosure defining a first chamber, a horizontal shaft, means for supporting said shaft for rotation in said enclosure, a disk within said enclosure mounted on said shaft for rotation therewith and having one side open to said first chamber, means for rotating said shaft and said disk at a speed from about 200 r.p.m. to about 800 r.p.m. to produce an artificial gravity on said disk, means defining a second chamber isolated from said first chamber and open to the other side of said disk, a source of heating fluid, means for conducting fluid from said source into said second chamber and into thin film contact with said other side of said disk, means for releasing heating fluid from said second chamber, a source of distilland, means within said first chamber and in approximate contact with the side of said disk for depositing a thin film of distilland on said one side of said disk during rotation of said disk, said depositing means including a flexible blade fixed substantially horizontally in said first chamber and extending substantially radially of said disk and curved toward said disk with its free edge close to said disk and extending downwardly in the direction of advance of said disk, means for conducting distilland from said source to a location just above the upper side of said blade adjacent said disk, and separate means for releasing both distilland and vapor from said first chamber.

2. A rotating disk still as in claim 1 in which said second chamber is partly defined by a pair of said disks.

3. A rotating disk still as in claim 1 including a spring urging said blade toward said disk.

References Cited
UNITED STATES PATENTS

| 3,190,817 | 6/1965 | Neugebauer et al. | 159—6 W X |
| 1,176,078 | 3/1916 | Mick et al. | 99—210 |
| 1,501,515 | 7/1924 | Testrup | 159—12 |
| 3,256,926 | 11/1963 | Gordon | 159—9 |

NORMAN YUDKOFF, Primary Examiner

J. SOFER, Assistant Examiner

U.S. Cl. X.R.

159—6 W, 11 B